June 12, 1951  E. W. BUCKLEY  2,556,748
AUTOMATIC VEHICLE HITCH
Filed Aug. 30, 1950
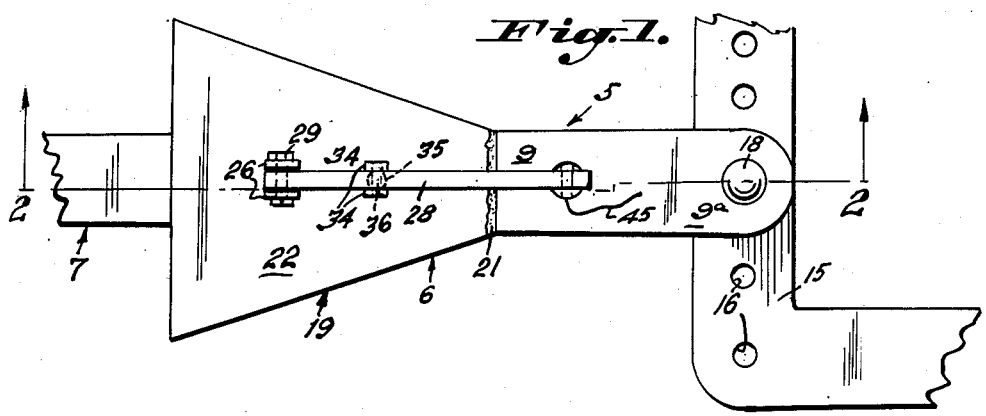
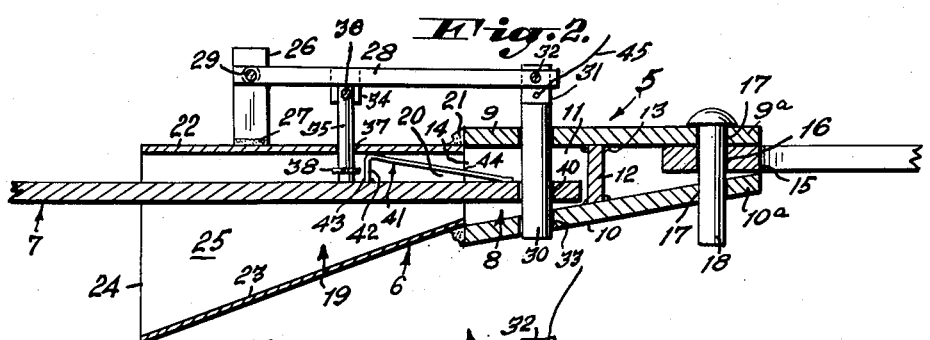
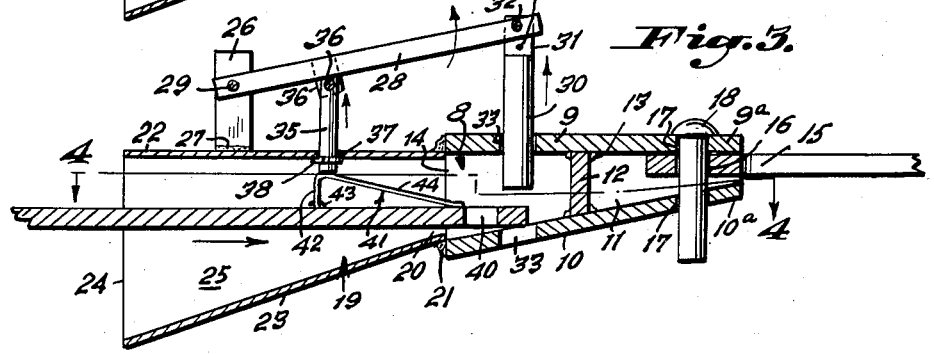
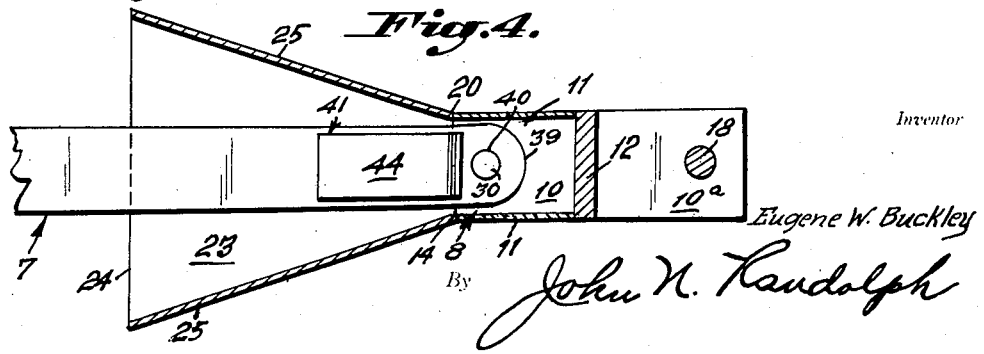
Inventor
Eugene W. Buckley
By John N. Randolph
Attorney Patented June 12, 1951

2,556,748

UNITED STATES PATENT OFFICE 2,556,748

AUTOMATIC VEHICLE HITCH

Eugene W. Buckley, Pembroke, Ky.

Application August 30, 1950, Serial No. 182,322

7 Claims. (Cl. 280—33.15)

1

This invention relates to a fully automatic vehicle hitch for coupling a draft vehicle and a trailer vehicle of extremely simple construction and which is actuated by the coupling elements thereof moving toward a coupling position for automatically positioning the hitch parts in a position to accomplish an automatic coupling and without requiring a pre-setting of any of the hitch or coupling parts for this purpose.

Another object of the invention is to provide a vehicle hitch or coupling of extremely simple construction employing no springs or latches for holding the parts of the hitch in either a released or coupled position.

Still another and important object of the invention is to provide a hitch including a section which is adapted to be swingably attached to a draft vehicle so that draft and trailer vehicles may be coupled by the hitch while disposed at any angle with respect to one another.

Still a further object of the invention is to provide a hitch which is capable of being readily operated by the operator of a draft vehicle for uncoupling a trailer vehicle without requiring the draft vehicle operator to dismount from the operator's seat and which hitch will automatically resume a position for automatic re-coupling with a trailer vehicle, after being uncoupled.

Various other objects and advantages of the invention will hereinafter become more fully apparent from the following description of the drawing, illustrating a presently preferred embodiment thereof, and wherein:

Figure 1 is a fragmentary plan view showing the vehicle hitch in a coupled position;

Figure 2 is a longitudinal vertical sectional view thereof taken substantially along a plane as indicated by the line 2—2 of Figure 1;

Figure 3 is a view similar to Figure 2 showing the coupler sections uncoupled and approaching a position for coupling, and Figure 4 is a horizontal sectional view taken substantially along a plane as indicated by the line 4—4 of Figure 3.

Referring more specifically to the drawing, the automatic vehicle hitch comprising the invention is designated generally 5 and includes a unit or section 6 which is adapted to be connected to a draft vehicle and a unit, designated generally 7, which is adapted to be secured to a part of a trailer vehicle.

The unit 6 includes a rearwardly opening socket, designated generally 8, having top and bottom walls formed by complementary portions of relatively heavy gauge bars 9 and 10, corre-

2 sponding side walls 11 adapted to be formed of a lighter gauge metal and an end wall 12, preferably formed of a heavy gauge metal and interposed between the bars 9 and 10 and intermediate of their ends and suitably secured thereto as by welding, as seen at 13. The bar 10 is disposed at an angle to the top bar 9 and is inclined upwardly and toward said bar 9 from the open, rear end of the socket 8 toward the opposite ends of the bars 9 and 10, so that the bottom portion of the socket 8 is flared with respect to the top thereof from its closed end 12 toward its opposite, open rear end 14. The top bar 9 and bottom bar 10 extend a substantial distance from the closed end 12 of the socket 8 and terminate at their forward, free ends in vertically spaced relationship to one another to provide bar portions 9a and 10a which are adapted to engage above and below a drawbar or similar draft connection 15, such as partially illustrated in Figures 1 to 3, and which is of the type normally fastened to and mounted behind a tractor, not shown. The portion of the drawbar 15 which normally extends transversely of the tractor or other draft vehicle is provided with the usual series of longitudinally spaced coupling pin receiving openings 16 and the bar portions 9a and 10a are provided with aligned openings 17 to register with any one of the openings 16 when the drawbar 15 is disposed between the bar portions 9 and 10, as illustrated in Figures 2 and 3, so that any suitable headed coupling pin 18 may be applied downwardly through the aligned openings 16 and 17 for detachably connecting the coupling section 6 to the drawbar 15. The end wall 12 of the socket 8 is disposed a sufficient distance from the openings 17 to afford a substantial clearance between said end wall and the drawbar 15 to thereby permit the coupling unit 6 to swing in substantially a horizontal plane or in a plane parallel to the plane of the drawbar 15 on the coupling pin 18 as an axis, so that the longitudinal axis of the unit 6 may be disposed at various angles to the drawbar portion to which said unit is connected, for a purpose which will hereinafter become apparent.

A modified funnel-shaped guide 19 has a restricted open end 20 which is disposed against the open end 14 of the socket 8 and secured thereto in any suitable manner as by welding, as seen at 21, said open end 20 of the guide 19 being preferably slightly smaller than the open end 14 of the socket 8. The guide 19 includes a top wall 22 which is disposed slightly below the level of the bar 9 and substantially parallel thereto, a bottom wall 23 which extends downwardly and outwardly with respect to the top wall 22 from the restricted inner end 20 of the guide 19 to its enlarged open outer or rear end 24, and corresponding side walls 25 which are flared outwardly from the end 20 to the end 24 of the guide 19. Likewise, the top wall 22 and bottom wall 23 are flared in width from the end 20 to the end 24 of the guide, as illustrated in Figures 1 and 4, respectively.

A pair of substantially parallel standards 26 are suitably secured as by welding, as seen at 27, to the top wall 22 and extend upwardly therefrom adjacent the outer end of the guide 19. One end of a lever 28 is disposed between the upper portions of the standards 26 and swingably connected thereto by a pivot pin 29 which extends between the standards and transversely through the lever 28 and on which said lever is journalled. The lever 28 extends from the standards 26 toward the inner or forward end of the coupling unit 6 and has its opposite, free end disposed above the socket 8. A coupling pin 30 has a bifurcated upper end 31 in which said last mentioned, free end of the lever 28 is loosely received and a pivot pin 32 extends through said bifurcated portion 31 and through the free end of the lever 28 for pivotally supporting the pin 30 on the lever 28 and in a depending position therebeneath. The bars 9 and 10, intermediate of the ends of the socket 8, are provided with aligned openings 33 of a larger diameter than the pin 30 and through said pin 30 is normally adapted to loosely extend, as illustrated in Figure 2. The lever 28, near to but spaced from its pivot 29 is provided with a pair of transversely spaced depending ears 34 between which is disposed the upper end of a lever actuating pin 35. A pivot pin 36 extends through the upper end of the pin 35 and through the ears 34 for swingably connecting said pin 35 to the lever 28 and for supporting the pin 35 in a depending position beneath the lever. The pins 30 and 35 are each pivotally mounted for swinging movement in a plane longitudinally of the lever 28. The pin 35 extends slidably through an opening 37 in the top wall 22 and is provided adjacent its lower end and beneath the wall 22 with a detachable enlargement 38, such as a spring ring, forming a stop to limit upward movement of the pin 35 through the opening 37 and to prevent disengagement of the pin from the top wall 22 while the stop 38 is applied.

The coupling section 7 comprises an elongated substantially rigid strap preferably formed of a relatively heavy gauge metal which is adapted to be attached to and project beyond the end of the tongue, not shown, of a trailer vehicle or which may constitute a trailer vehicle tongue. The strap 7 is of a width only slightly less than the width of the socket 8, as seen in Figure 4 and is provided with a rounded free end 39 and has an opening 40 disposed adjacent thereto for registration with the openings 33, in one position of the strap 7 relatively to the unit 6. An elongated plate or strip 41 has an end 42 which is secured as by welding as seen at 43 to the upper side of the strap 7 and transversely thereof. The plate 41 includes a long ramp portion 44 which extends longitudinally of the strap 7 and is inclined downwardly from the upper end thereof which extends integrally from the upper end of the plate portion 42 toward its opposite free end which is disposed adjacent the opening 40. Accordingly, and as best seen in Figures 2 and 3, the ramp portion 44 extends at an incline upwardly away from the strap 7 in a direction away from the opening 40 and the rounded end 39.

Assuming that the opposite end of the strap 7, not shown, is connected to a trailer vehicle tongue or that the strap 7 constitutes a trailer vehicle tongue and assuming that the end thereof as illustrated is completely disengaged from the hitch unit 6, the lever 28 will swing downwardly by gravity to or below its position of Figure 2, so that the pin 30 will have its lower portion projecting downwardly from the socket 8. To couple two vehicles, not shown, to which the sections 6 and 7 are connected, section 6 may be swung on its pivot 18 to substantially align the axis of said section with the strap 7 and the draft vehicle, for example, to which the unit 6 is connected may then be backed or moved toward the strap or tongue 7 and while the free end of said strap 7 is being supported at approximately the level of the bottom of the socket 8. Accordingly, as the units 6 and 7 are moved toward one another the strap end 39 will readily enter the enlarged entrance opening 24 of the guide 19 and said end 39 may then slide inwardly and upwardly of the unit 6 on the bottom wall 23 of said guide and be centered with respect to the socket 8 by the inwardly converging side walls 25. Consequently, as the units 6 and 7 are moved toward one another or as one unit is moved toward the other, the strap end 39 will ride up the bottom 23 into the socket 8 and as the restricted end 20 of the guide 19 is smaller than the open end 14 of the socket 8 no obstruction of this movement of the strap end 39 into the socket 8 will occur. As the opening 40 passes under the lever actuating pin 35 the lower end of the ramp 44, located adjacent thereto, will move into contact with the lower end of the pin 35 so that as the strap end 39 thereafter continues to move toward and into the socket 8 the ramp surface 44 will displace the pin 35 upwardly through the opening 37 in which it has a loose sliding fit for swinging the lever 28 upwardly on its pivot 29 to thereby displace the coupling pin 30 upwardly out of engagement with the opening 33 of the bottom bar 10 and so that its lower end will be disposed substantially above said bar 10, as seen in Figure 3. As the forward or leading end 39 of the strap 7 reaches a position beneath the pin 30 the lower end of the pin 35 will have ridden up the ramp 44 and will be disposed adjacent the upper, rear end thereof. As the opening 40 approaches a position beneath the pin 30 the pin 35 will ride off of the upper rear end of the ramp 44 allowing the lever 28 and the pins 30 and 35 to move downwardly so that the lower end of the pin 30 will be resting on the strap 7 as the opening 40 moves into registry with the openings 33 to permit the pin 30 to drop through the opening 40 and thence through the opening 33 of the bar 10 to securely couple the sections 6 and 7, as illustrated in Figure 2. The wall 12 functions as a stop to prevent the strap 7 moving sufficiently so that the opening 40 will be completely out of registry with the openings 33 so that should the pin 30 not drop through the opening 40 as the strap 7 moves inwardly of the socket 8, a slight movement of the strap outwardly of said socket will accomplish the coupling; however, this is extremely unlikely. As seen in Figure 4, the strap 7 is only slightly narrower than the socket 8 so that with the clearance afforded the pin 30 by the opening 40 it will be substantially impossible for said opening not to align with the pin as the strap end 39 approaches the socket wall 12. A cord or flexible member 45 is suitably attached to the upper portion of the pin 30 or the free end of the lever 28 and is adapted to have an opposite end, not shown, disposed convenient to the operator of the draft vehicle on which the drawbar 15 is mounted, so that said operator without leaving the operator's seat may elevate the lever 28 and pins 30 and 35 for uncoupling the sections 6 and 7 by an upward pull on the flexible member 45. Thereafter when the flexible member 45 is released the parts 28, 30 and 35 will return to their positions of Figure 2 but with the strap 7 removed from the unit 6 and in this position will be ready to automatically re-couple said strap 7 to the unit 6 in the same manner as previously described.

Various modifications and changes are contemplated and may obviously be resorted to, without departing from the spirit or scope of the invention as hereinafter defined by the appended claims.

I claim as my invention:

1. A draft vehicle and trailer vehicle hitch comprising a section adapted to be detachably connected to a draft vehicle drawbar and a section adapted to be connected to a trailer vehicle, said draft vehicle connected section comprising a socket having a restricted closed end and an enlarged open, rear end, said socket having top and bottom extensions projecting forwardly from its closed end and away from its open end, said extensions having aligned apertures and being adapted to straddle a portion of a drawbar and to be coupled thereto by a coupling unit extending through the apertures and through an aperture of the drawbar, a flared guide connected to and extending from the open end of said socket and forming a flared extension thereof having a restricted open end registering with the open end of said socket and an opposite enlarged entrance end, a support fixed to and rising from said guide, a lever pivotally mounted at one end on said support for vertical swinging movement and extending therefrom toward said socket, said socket having top and bottom walls provided with aligned openings, a pin pivotally connected to the free end of the lever and depending therefrom loosely through said openings of the socket, a lever actuating pin pivotally connected to said lever intermediate of its ends and depending therefrom and extending downwardly and into said guide, said guide having a top wall provided with an opening for loosely accommodating the lever actuating pin; said other trailer vehicle connected section comprising an elongated bar having a leading end movable into the guide and guided thereby into the socket, said bar having an opening adjacent its leading end, and a ramp having a lower end disposed adjacent said opening and extending longitudinally of the bar away from the leading end thereof and inclined upwardly relatively to the top surface of the bar in a direction away from the bar opening, said ramp engaging the lower end of the lever actuating pin as the leading end of the bar approaches the socket for displacing the lever actuating pin and lever upwardly to elevate the first mentioned coupling pin in the socket to a level above the bar, said lever actuating pin riding off of the upper end of the ramp as said bar opening moves into registry with the socket openings to permit the pins and lever to move downwardly whereby the coupling pin will pass loosely through the bar opening and bottom socket opening for automatically coupling the vehicle hitch sections.

2. A vehicle hitch as in claim 1, said socket being only slightly wider internally than the bar.

3. A vehicle hitch as in claim 1, the apertures of said socket extensions being spaced a substantial distance from the closed end of the socket for spacing the socket from the drawbar whereby the drawbar connected section may swing on the drawbar on the coupling element as an axis.

4. A vehicle hitch as in claim 1, each of said pins being pivotally connected to the lever for swinging movement in a direction longitudinally of the lever.

5. A vehicle hitch as in claim 1, said guide having a bottom wall inclined downwardly and away from the open end of the socket and being provided with corresponding side walls disposed in outwardly diverging relationship from the socket.

6. A vehicle hitch as in claim 1, the restricted forward end of said guide being slightly smaller than the open rear end of the socket and the enlarged rear entrance end of the guide being substantially larger than the open end of the socket.

7. A vehicle hitch as in claim 1, and a flexible member connected to the upper portion of said coupling pin and adapted to be actuated from a position remote thereto for elevating the lever and the pins connected thereto to release said bar from a coupled position in the socket for uncoupling the hitch sections, said pins and lever being displaced downwardly by gravity upon release of said flexible member for positioning the coupling pin in engagement with the socket openings and the latch actuating pin in a position to be engaged and actuated by the ramp when said bar is again displaced inwardly of the guide.

EUGENE W. BUCKLEY.

REFERENCES CITED

The following references are of record in the file of this patent:

UNITED STATES PATENTS

| Number | Name | Date |
| --- | --- | --- |
| 1,837,940 | Ade | Dec. 22, 1931 |
| 1,939,463 | Rockinger | Dec. 12, 1933 |
| 2,113,338 | Wohldorf | Apr. 5, 1938 |
| 2,441,285 | Pfeiffer | May 11, 1948 |